March 5, 1946. C. W. SIDNEY 2,395,977
SPOT WELDING APPARATUS
Filed Oct. 20, 1942 4 Sheets-Sheet 2

INVENTOR.
CHARLES W. SIDNEY
BY Oberlin, Limbach & Day.
ATTORNEYS

March 5, 1946.     C. W. SIDNEY     2,395,977
SPOT WELDING APPARATUS
Filed Oct. 20, 1942     4 Sheets-Sheet 3
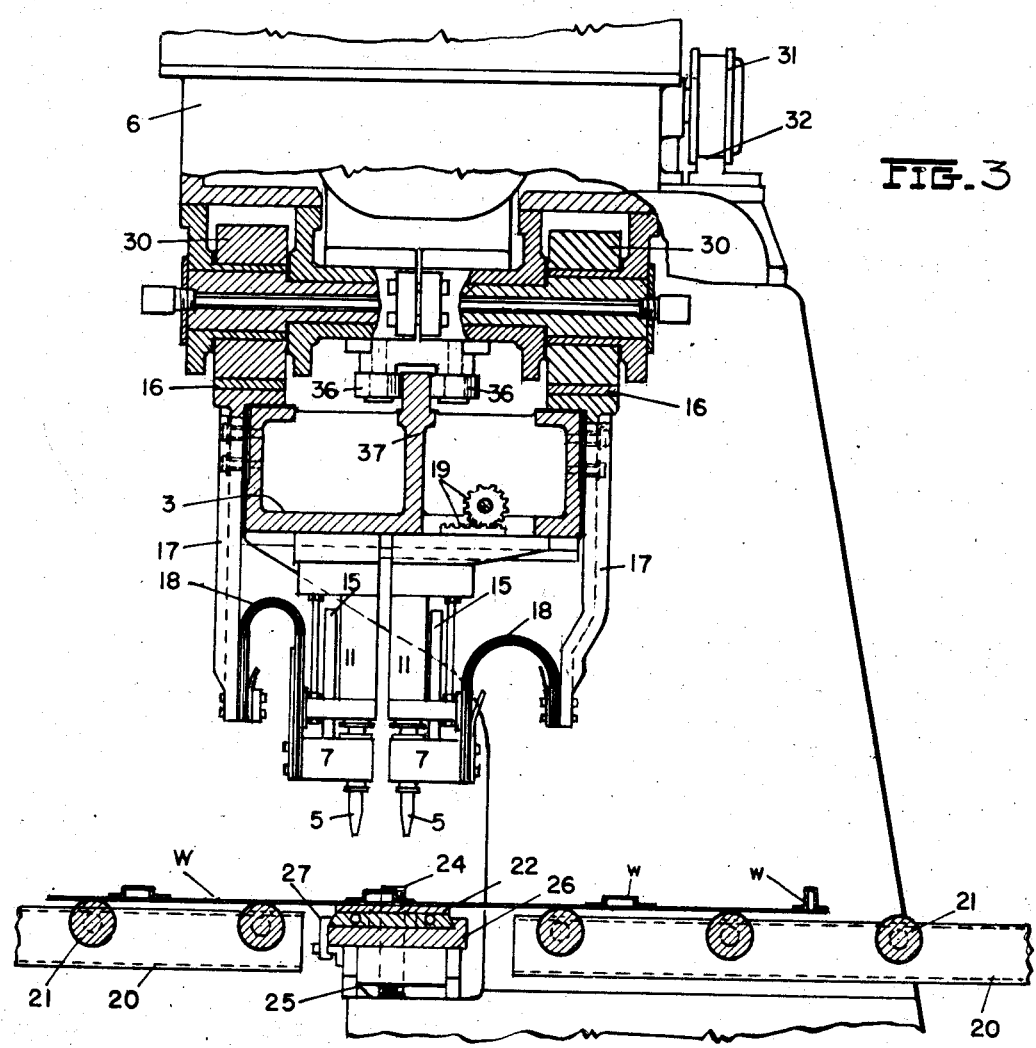
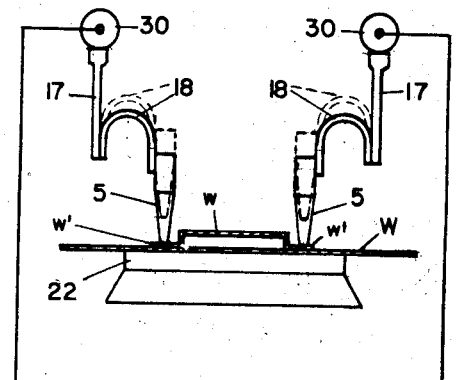
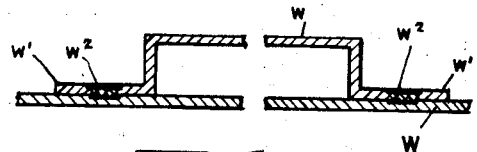
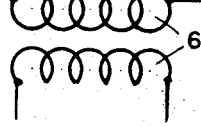
INVENTOR.
CHARLES W. SIDNEY
BY Oberlin, Limbach & Day
ATTORNEYS March 5, 1946.　　　　　C. W. SIDNEY　　　　　2,395,977
SPOT WELDING APPARATUS
Filed Oct. 20, 1942　　　　　4 Sheets-Sheet 4
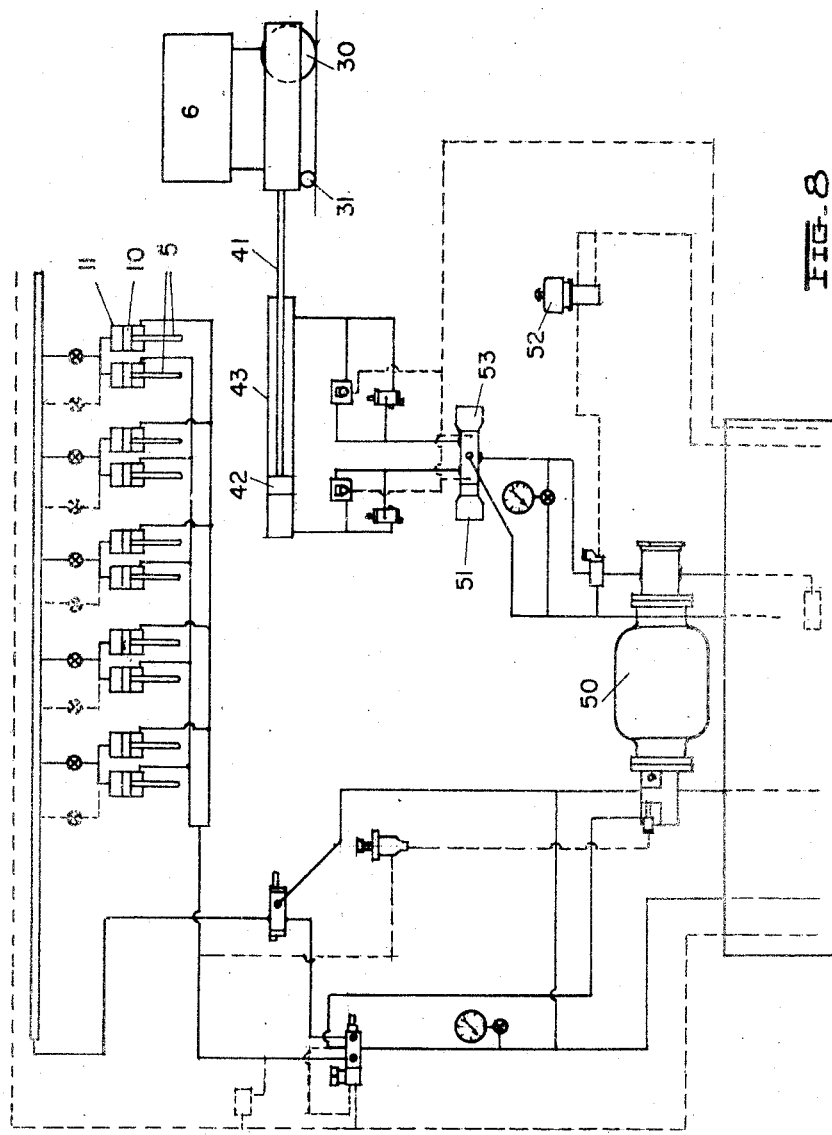
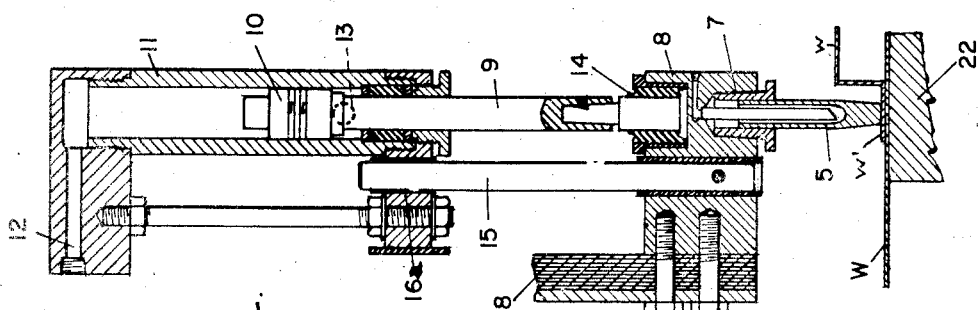
INVENTOR.
CHARLES W. SIDNEY
BY Oberlin, Limbach & Day
ATTORNEYS Patented Mar. 5, 1946

2,395,977

UNITED STATES PATENT OFFICE 2,395,977

SPOT WELDING APPARATUS

Charles W. Sidney, Summit, N. J., assignor of one-half to The E. F. Hauserman Company, Cleveland, Ohio, a corporation of Ohio Application October 20, 1942, Serial No. 462,711

6 Claims. (Cl. 219—4)

The present improvements relate to that form of electric resistance welding known as spot welding wherein a plurality of electrodes movable towards and from the work is employed.

In my preferred arrangement of apparatus such electrodes are employed in pairs, the welding current being conducted to one electrode, thence through the work and out by the other electrode. By this arrangement I have discovered that where welding together metal sheets of light gauge as, for example, angle or channel reenforcements to one side of a relatively thin sheet, the opposite face of the sheet will be left substantially unmarred or disfigured by "spots" resulting from the welding operation.

Another object of the invention is to provide a spot welding mechanism wherein welding current may be supplied to a plurality of electrodes in sequence as they are brought into contact with or pressed against the work, while at the same time ensuring that the electrical characteristics of the welding circuit and particularly the portion which extends from the one terminal through the electrodes and work to the other terminal of the usual transformer, remain substantially constant.

Still another object of my invention is to greatly speed up production in spot welding operation either where a series of spot welds is repetitively formed or where such series may vary from one operation to the next.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:

Fig. 3 is partly an end view and partly a section, as indicated by the line 3—3 on Fig. 1, of a pair of the electrodes which form a feature of the apparatus, the mounting and electrical connections for such electrodes being likewise shown;

Fig. 4 is a view similar to that of Fig. 3 taken at a plane parallel with the plane of Fig. 3 as indicated by the line 4—4 on Fig. 1;

Fig. 5 is a broken plan view of a piece of work such as is adapted to be spot welded on the illustrated apparatus or machine;

Fig. 6 is a transverse section of a portion of such work on a somewhat larger scale, the plane of the section being indicated by the line 6—6 of Fig. 5;

Fig. 7 is a diagrammatic view corresponding with Fig. 3, showing the manner in which the welding current is passed through the work by use of my improved paired electrodes; and Fig. 8 is a diagrammatic representation of the hydraulic system whereby the various parts of the apparatus or machine are operated.

Figure 1:
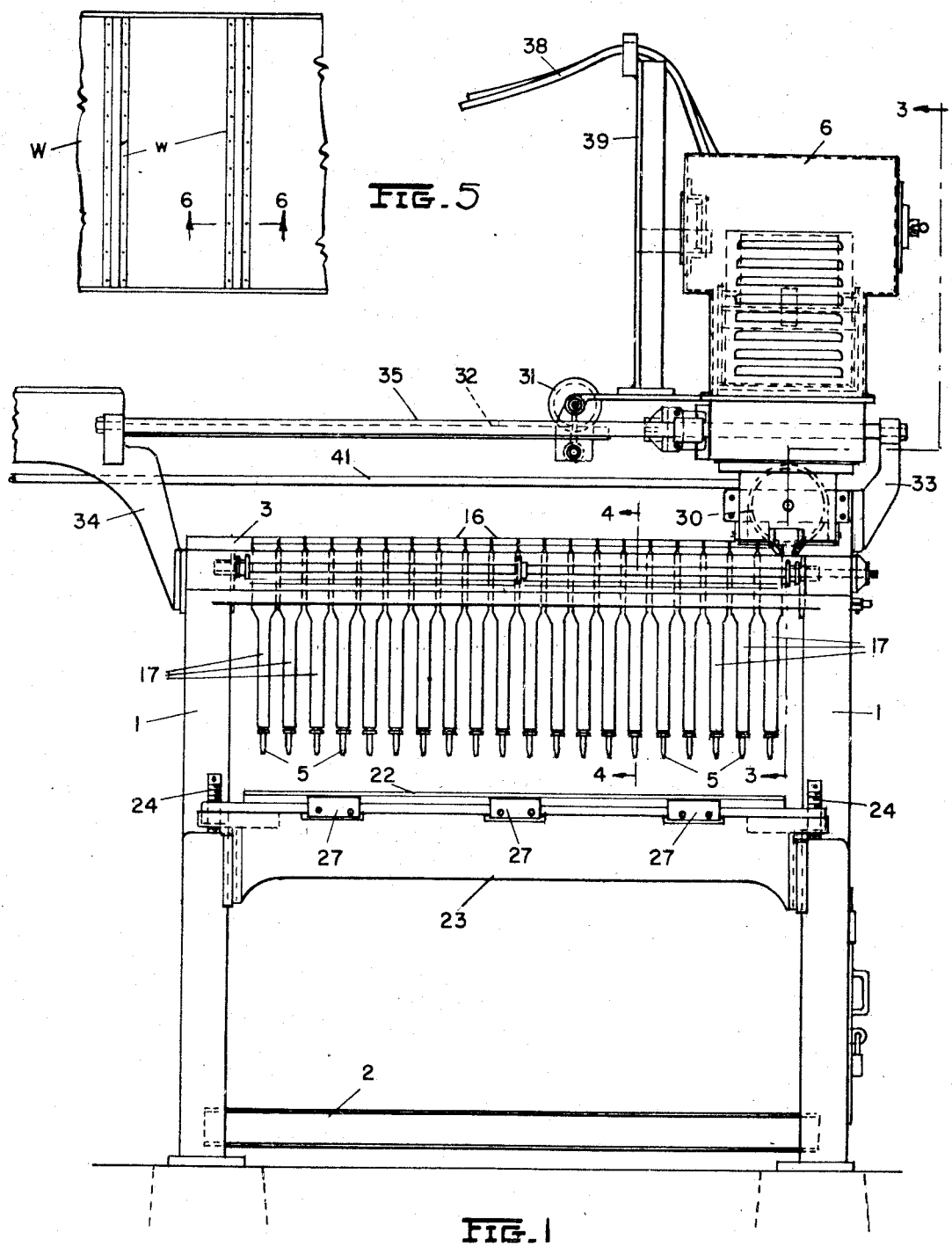
Fig. 1 is a front elevation of a welding apparatus or machine embodying my invention.
Figure 2:
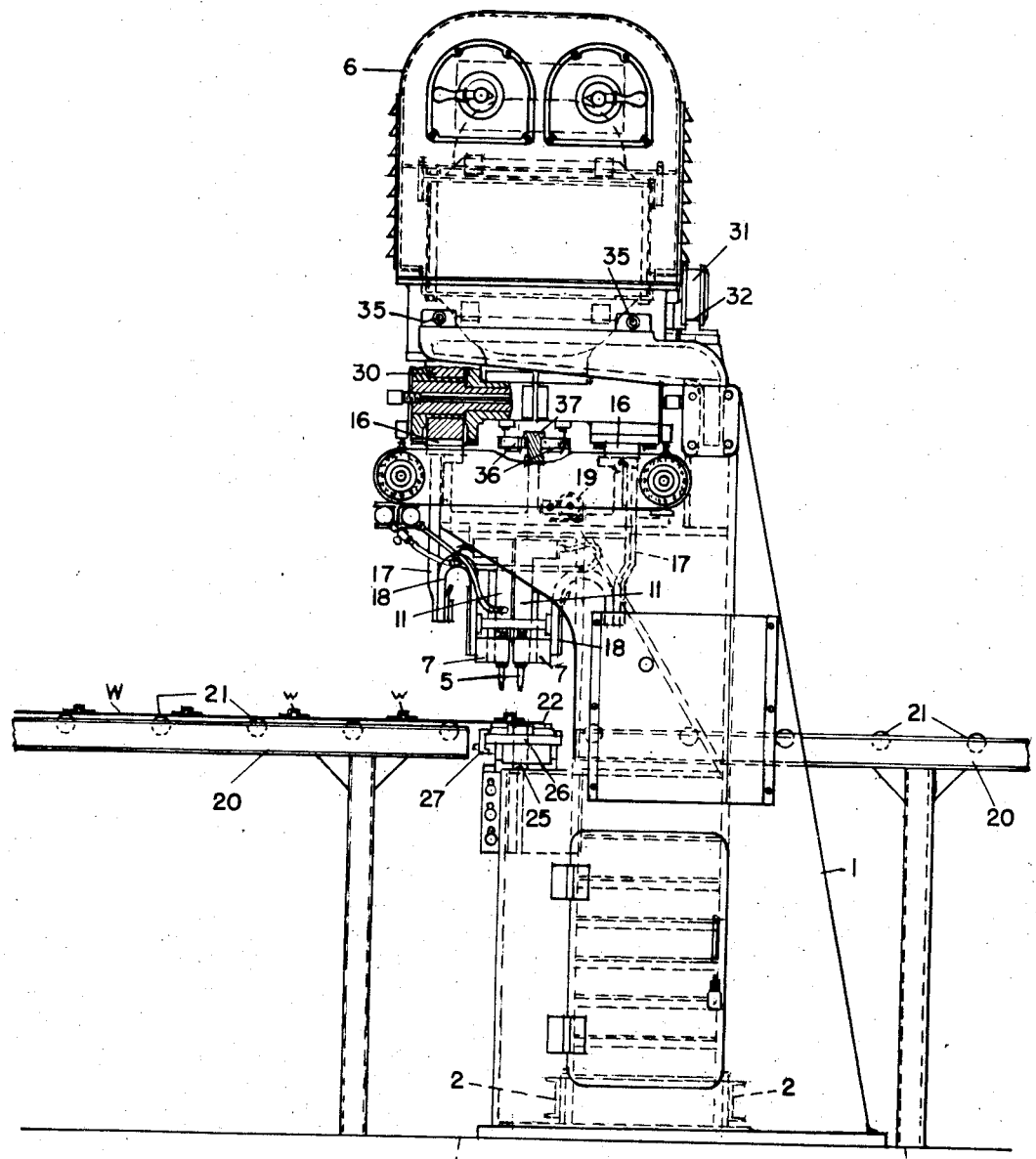
Fig. 2 is an end view of said apparatus or machine as viewed from the right of Fig. 1, there being included in Fig. 2 a showing of a table whereon the work, i. e., the parts that are to be welded together, may be movably supported.

Referring to Figs. 1 and 2, the frame of the illustrative machine there shown comprises two end members 1 suitably connected together near their lower ends by braces 2, 2 and similarly connected at their upper ends by a bridge 3 which, as will be presently described, is designed and constructed to carry a multiple series of paired vertically movable electrodes 5, together with actuating mechanism for said electrodes as well as suitable conductors for effecting an electric connection between the same and the terminals of a transformer 6.

The individual electrodes 5 are in general of familiar construction being hollow and provided with connections for circulating a cooling fluid therethrough, as shown in Figs. 3 and 4. Any further detailed description of such electrodes per se is accordingly deemed unnecessary. As illustrated in the figures last referred to, each such electrode is detachably secured by a socket connection 7 to the lower face of a vertically reciprocable head 8 which is in turn secured to the lower end of an hydraulic plunger 9, the latter having a piston 10 on its upper end that operates within a cylinder 11. By a system of controls which will be later described, a suitable liquid under pressure may be supplied to such cylinder 11 above the piston 10 by way of a passageway 12 and to said cylinder below the piston by way of a passageway 13.

The connection between the lower end of plunger 9 and head 8 is electrically insulated as by a bushing 14 and a second guide-plunger 15 which is attached at its lower end to head 7 and is slidably fitted in an aperture 16a on one side of cylinder 11 is similarly electrically insulated.

The welding current is conducted to the individual electrode 5 from the corresponding terminal of the transformer 6 through a contact 16, a bar 17 depending therefrom and a generally U-shaped flexible conductor 18 which is attached to the head 8 adjacent the socketed connection between the latter and the electrode.

As shown in Figs. 2 and 3, the electrodes 5 are arranged in pairs, a series of such pairs being supported in desired transverse and longitudinal relationship from the under side of the bridge or head 3. As shown in Fig. 3, at least one of each such pairs of electrodes is supported on the under side of bridge 3 so as to be capable of adjustment transversely thereof in order correspondingly to vary the space between the electrodes of such pairs. Thus as illustrated, a rack and pinion device 19 is provided for so adjusting the right hand member of the two electrodes which are shown in Fig. 3.

For the particular spot welding operation designed to be performed by the illustrated machine, such series of paired electrodes is disposed in a straight line transversely of the direction in which the work W is adapted to be moved on work table 20, the latter being provided with a series of rollers 21 to facilitate such movement of the work. Said table, however, is interrupted for a space directly beneath the series of welding electrodes 5, this space being occupied by a water cooled work support or anvil 22 which extends entirely across the frame of the machine, as shown in Fig. 1. Said anvil is supported in turn on a heavy vertically adjustable cross beam 23 slidably guided between the end members 1 of said frame, adjustment of said beam being effected by means of set screws 24 that engage with ledges 25 on said end frame members. As best shown in Fig. 3, the plate 22 which constitutes the anvil proper, has its opposite side edges bevelled, one such edge engaging an undercut shoulder on a secondary support 26, and the other edge being engaged by a series of undercut clamps 27 which serve to hold the anvil securely in place.

The transformer 6 in general is of conventional construction and detailed illustration thereof is omitted. The coils of such transformer are enclosed in a suitable housing and the whole is mounted for travel back and forth along the bridge 3 from which, as previously noted, the series of welding electrodes 5 with their appurtenant parts are suspended. The contacts 16 for the respective electrodes of the paired series form in effect two parallel trackways on which the transformer is supported by rollers 30 mounted on, and in effect forming part of, the respective secondary terminals of the transformer. In other words, by means of such rollers the terminals in question are successively brought into engagement with the pairs of contacts 16, as the transformer is moved back and forth across the machine. It is unnecessary to describe the details of the roller mountings which are fully illustrated in Fig. 3. The rollers, equally with the remainder of the transformer secondary terminals, will of course be adequately electrically insulated from each other.

To assist in guiding the transformer during such movement, a flanged wheel 31 is provided on its one side, such wheel engaging a rail 32 that extends between brackets 33 and 34 attached to the upper ends of the respective end frame members 1. In order to strengthen the superstructure along which the transformer travels, these brackets are connected by two stay rods 35. Additional guide means for the transformer are provided by rollers 36 on the under side thereof which engage with the respective faces of a rib 37 that extends along the upper surface of bridge 3 of the main frame of the machine. The cables 38 for supplying the current to the transformer are carried over a supporting member 39 adjacent the left hand end thereof, such cables thence extending to a suitable source of current (switchboard or the like, not shown) which will be conveniently supported on an extension of bracket 34.

Any suitable means may be employed for moving the transformer back and forth across the machine to supply welding current to the pairs of electrodes through their corresponding pairs of contacts. As shown (see Figs. 1 and 8) a rod 41 connects the base of the transformer with a hydraulically actuated piston 42 operating in a cylinder 43, to the opposite ends of which fluid under pressure may be supplied or exhausted as desired. By such means not only may the transformer be caused to travel in either direction but the extent of its travel may be determined as desired. Thus it may be moved to the left from the position illustrated in Fig. 1 to bring its secondary terminals into engagement in succession with the entire series of contacts 16; or said transformer may be moved only part of the indicated distance and then be returned to starting position. Furthermore, upon such reverse movement the terminals in question of course again engage in reverse order the contacts just passed over and the welding operation accomplished in the course of the first movement of the transformer may be repeated in reverse with a new setting of the work pieces.

As further diagrammatically illustrated in Fig. 8, the system of hydraulic control provided for effecting back and forth travel of the transformer 6 includes connections for effecting reciprocation of the pistons 10 in cylinders 11 whereby the individual electrodes 5 are actuated. Since the latter, in the form of the machine illustrated, are arranged in pairs and each pair is conjointly operative, the hydraulic connections as shown in Fig. 8 extend to the respective pairs of cylinders 11. It will further be noted that by means of suitable valves, selected pairs of the electrodes may be cut out, i. e. rendered inoperative. Accordingly, in passing over the corresponding contacts the traveling transformer will of course be without effect. In this way a spacing of the welding operations to be performed transversely of the machine may be varied as desired within the limits of the machine's transverse dimension and the number of pairs of electrodes provided.

By way of further description of the lay-out of the hydraulic control shown in Fig. 8, it will suffice to state that the fluid employed in the system is supplied under desired pressure by means of suitable pumps operated by a small electric motor 50 and that suitable control valves in addition to those previously referred to are provided which are conveniently operated by means of electric solenoids, so that the entire operation may be controlled by a set of push buttons from one point on the machine. Thus in order to advance the transformer it will suffice to energize solenoids 51 and 52, and conversely for effecting return travel of the transformer, to energize solenoids 52 and 53; while to stop movement of the transformer in either direction all the solenoids are deenergized.

Primary switching means will also be provided so that the secondary conductor rollers 30 of the welding transformer will be in contact with the electrode contact pads 16 during the total welding cycle for each electrode.

The construction of the illustrated machine and the operation of its component parts having been sufficiently described, the operation involved in spot welding the particular work pieces illustrated in Figs. 3, 5, 6 and 7 will now be set forth. It should be explained that for the purpose of illustration, the particular job for which such illustrated machine has been designed is the attachment of reenforcing channels to a sheet W which constitutes the main work piece, such channels $w$ being formed with oppositely extending flanges $w'$ spot welded at intervals to the sheet W. Work pieces thus assembled are largely used in the manufacture of metal partitions but obviously may have many other fields of use. Where employed as a partition wall the face of the sheet W opposite the reenforcements will be exposed when the partition is erected and should be free of any marring "spots" so as to be capable of being painted or otherwise given a smooth even finish.

In Figs. 1 and 2 a sheet W is shown supported on work table 20, such sheet having transversely disposed on its upper face a series of channels $w$ at properly spaced intervals. Such sheet is manipulated to bring one such channel beneath the series of paired electrodes 5, in which position the portion of the sheet on which the channel rests will lie directly over the anvil strip 22. Previously the transverse spacing of the electrodes 5 will be adjusted by the rack and pinion device 19 so that when depressed the electrodes will properly contact with the oppositely extending flanges $w'$ of the channel. Also the control valves described in connection with Fig. 8 will be previously set so that either all or such selected pairs of electrodes as it may be desired to use will be actuated, i. e. depressed, upon pressure fluid being supplied to the cylinders 11 associated with such electrodes. For example, if the sheet W is of such width as to extend entirely across the table, the whole series of paired electrodes may be employed in the welding operation, or every other one thereof may be cut out. Similarly, if the sheet is narrower than the work table all of the electrodes lying beyond the sheet will be cut out and of those in position to contact with the work all or only some may be left connected for operation.

Assuming the work pieces to be properly positioned and the selected electrodes operatively connected for up and down movement, fluid pressure will be supplied to the upper ends of the cylinders 11 associated with such electrodes thereby moving the latter downwardly into contact at desired points with flanges $w'$ of channel $w$, as shown in full lines in Fig. 7.

The traveling transformer, properly connected to the suitable source of current, is thereupon started in motion, e. g. from the right hand end of the machine as shown in Fig. 1, and in the course of its travel its respective secondary terminals will engage in sequence the contacts associated with the respective pairs of electrodes. In the case of such of the latter as have been depressed into engagement with the work, a suitable welding current is thus caused to pass from the one terminal through the corresponding electrode, the work pieces and the other electrode, back to the other terminal. Where the electrodes are left in raised position, as indicated in dotted line in Fig. 7, no current will of course pass therethrough even though their contacts be thus engaged by the terminals of the transformer. By reason of such paired arrangement of these electrodes while the underlying work piece, the sheet W as illustrated, is included in the circuit thus provided for the welding current, no great volume of the latter will pass transversely through said sheet and the heating effect will be largely if not entirely confined to the limited pressure areas $w^2$ between the two work pieces directly beneath the respective electrodes. As a result, the marring action ordinarily encountered in a spot welding operation is substantially eliminated and the lower face of the work piece W left in unchanged condition suitable for finishing in any manner desired.

Upon completion of the traversing movement of the transformer in one direction the fluid pressure is supplied to the lower ends of cylinders 11 so as to raise the corresponding paired electrodes, and if the next operation is to be a repetition of the previous one, i. e. if as illustrated another channel $w$ is thereupon to be welded to sheet W, such work pieces are moved on the table to bring the next channel in proper position under the series of electrodes and the latter depressed into contact. The transformer can then be moved in reverse direction in order to repeat the operation just described but in reverse. In other words, it is unnecessary to bring the transformer back to its initial position for successive operations, but it can be simply moved back and forth along the line of paired electrodes which are set for operation. In the case of a narrow sheet where only half of the series of electrodes is required, the travel of the transformer may be stopped at a corresponding point and upon shifting the work and resetting the electrodes the operation may be repeated in reverse. Furthermore, where successive operations differ in the number of electrodes required, the latter may be quickly and easily set and the welding operation be started with the traveling electrode in proper position at either side of the machine. The result is that spot welding time may be greatly reduced by the use of my improved machine, setting up of the work being greatly facilitated and unnecessary movement of machine parts being eliminated. It will of course be understood that the series of paired electrodes need not necessarily be arranged in a straight line, but for other jobs than the particular one just described they may be disposed to contact with work pieces of various shapes and sizes so as to spot weld them together at such points as may be required.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In welding mechanism of the character described, a plurality of spaced pairs of electrodes; a stationary contact for each electrode, leads between said contacts and electrodes providing the same impedance in each electrode circuit, a movable transformer with rollers constituting secondary terminals, trackway means on which said rollers travel including pairs of contacts connected with the corresponding pairs of electrodes; means for moving said transformer over the contacts of said electrodes; and means adapted to maintain selected pairs of electrodes in contact with the work while current is thus passed.

2. In welding mechanism of the character described, a plurality of spaced electrodes; trackway means including stationary contacts and leads therefrom to the electrodes, providing the same impedance in each electrode circuit, a reciprocably movable transformer with rollers constituting secondary terminals adapted upon movement of said transformer in either direction to successively engage said contacts; means for moving said transformer over said contacts; and means adapted to maintain selected electrodes in contact with the work while current is thus passed.

3. In welding mechanism of the character described, the combination of a plurality of spaced pairs of electrodes movable towards and from the same face of the work, stationary contacts and leads therefrom to said electrodes providing the same impedance in each electrode circuit, said contacts being in trackway arrangement, a movable transformer provided with rollers as secondary terminals adapted to complete each circuit by engaging said contacts, and means for moving said transformer to engage such terminals with successive pairs of said contacts.

4. In welding mechanism of the character described, the combination of a longitudinally aligned series of transversely spaced pairs of electrodes movable towards and from the same face of the work, stationary contacts in row arrangement and leads therefrom to said electrodes providing the same impedance in each electrode circuit, a movable transformer provided with secondary terminals adapted to complete each circuit by moving over and engaging said contacts, and means for moving said transformer to engage such terminals with successive pairs of said contacts.

5. In welding mechanism of the character described, the combination of a longitudinally aligned series of transversely spaced pairs of electrodes movable towards and from the same face of the work, the transverse spacing of such pairs of electrodes being adjustable to suit the requirements of the work, stationary contacts in row arrangement and leads therefrom to said electrodes providing the same impedance in each electrode circuit, a movable transformer provided with roller secondary terminals adapted to complete each circuit by engaging said contacts, and means for moving said transformer to engage such terminals with successive pairs of said contacts.

6. In welding mechanism of the character described, the combination of a plurality of spaced pairs of electrodes movable towards and from the same face of the work, stationary contacts in row arrangement and leads therefrom to said electrodes providing the same impedance in each electrode circuit, a reciprocably mounted transformer provided with secondary terminals adapted to complete each such circuit by engaging said contacts, supplemental guide rail and wheel means for said transformer including a stationary rib for wheel-engagement of both of its lateral faces, and means for reciprocating said transformer to engage such terminals with successive pairs of said contacts irrespective of the direction of movement of said transformer.

CHARLES W. SIDNEY.